United States Patent
Imamura

(10) Patent No.: US 7,808,882 B2
(45) Date of Patent: Oct. 5, 2010

(54) METHOD AND SYSTEM FOR OPTIMIZED REFERENCE SIGNAL DOWNLINK TRANSMISSION IN A WIRELESS COMMUNICATION SYSTEM

(75) Inventor: Kimihiko Imamura, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 711 days.

(21) Appl. No.: 11/736,174

(22) Filed: Apr. 17, 2007

(65) Prior Publication Data

US 2008/0260062 A1    Oct. 23, 2008

(51) Int. Cl.
*H04J 11/00* (2006.01)
(52) U.S. Cl. .............. 370/206; 370/207; 370/281; 370/343; 370/344; 455/101; 455/103
(58) Field of Classification Search .......... 370/343, 370/344, 480, 491, 206, 207; 375/260, 267, 375/146, 147, 135; 455/562.1, 101, 91, 103
See application file for complete search history.

(56) References Cited

U.S. PATENT DOCUMENTS

| | | | |
|---|---|---|---|
| 6,577,617 B1 * | 6/2003 | Ue et al. ............. | 370/347 |
| 6,782,059 B2 | 4/2004 | Lin | |
| 7,035,284 B2 | 4/2006 | Willenegger et al. | |
| 7,170,923 B2 | 1/2007 | Yeo et al. | |
| 2003/0128744 A1 | 7/2003 | Yeo et al. | |
| 2003/0174675 A1 | 9/2003 | Willenegger et al. | |
| 2003/0174676 A1 | 9/2003 | Willenegger et al. | |
| 2003/0174686 A1 | 9/2003 | Willenegger et al. | |
| 2006/0116156 A1 * | 6/2006 | Haseba et al. ............ | 455/525 |
| 2006/0172704 A1 * | 8/2006 | Nishio et al. ............ | 455/67.11 |
| 2007/0047498 A1 | 3/2007 | Zhang et al. | |
| 2007/0195906 A1 * | 8/2007 | Kim et al. ............ | 375/267 |
| 2010/0097963 A1 * | 4/2010 | Astely et al. ............ | 370/280 |

FOREIGN PATENT DOCUMENTS

| | | |
|---|---|---|
| EP | 975193 A2 | 1/2000 |
| EP | 975194 A2 | 1/2000 |

OTHER PUBLICATIONS

3GPP TS 36.211 V1.0.0 (Mar. 2007) 3rd Generation Partnership Project; Technical Specification Group Radio Access Network; Physical Channels and Modulation Release 8.*
3rd Generation Partnership Project; Technical Specification Group Radio Access Network; Physical Channels and Modulation (Release 8), 3GPP TS 36.211 V0.4.0 (Feb. 2007).
R1-063254, Reference signal structure for 4-TX antenna MIMO, 3GPP TSG RAN WG1 Meeting #47, Riga, Latvia, Nov. 6-10, 2006.
R1-0-63392, SINR measurements for Scheduling with Interference Coordination, 3GPP TSG RAN WG1 Meeting #47, Riga, Latvia, Nov. 6 10, 2006.

* cited by examiner

*Primary Examiner*—Rafael Pérez-Gutiérrez
*Assistant Examiner*—Neda Behrooz
(74) *Attorney, Agent, or Firm*—Thomas R. Berthold

(57) ABSTRACT

A method and system optimizes the transmission of a downlink reference signal (DLRS) in a wireless communication system that uses orthogonal division multiple access (OFDMA) for the downlink. Each Node-B (base station) is capable of transmitting the DLRS reference symbols in different subframes of the OFDM radio frame and changing both the number and location of the subframes in response to changing network conditions. The network conditions include the number of terminals being served by the Node-B and multiple access interference (MAI) from adjacent Node-Bs.

12 Claims, 10 Drawing Sheets

SUBFRAME STRUCTURE A

*Antenna Port 1*

*Antenna Port 2*

SUBFRAME STRUCTURE B

SUBFRAME STRUCTURE B

SUBFRAME STRUCTURE C

Antenna Port 1
SUBFRAME STRUCTURE D

Antenna Port 2
SUBFRAME STRUCTURE D

METHOD AND SYSTEM FOR OPTIMIZED REFERENCE SIGNAL DOWNLINK TRANSMISSION IN A WIRELESS COMMUNICATION SYSTEM

BACKGROUND OF THE INVENTION

1. Field of the Invention

The invention relates generally to a wireless communication system, like a cellular network, and more particularly to downlink transmission of a reference signal in the network.

2. Description of the Related Art

A cellular network is a wireless communication system made up of a number of cells, each served by a fixed transmitter, known as a cell site or base station. Each cell site in the network typically overlaps other cell sites. The most common form of cellular network is a mobile phone (cell phone) system. All of the base stations are connected to cellular telephone exchanges or "switches", which in turn connect to the public telephone network or another switch of the cellular company.

The $3^{rd}$ Generation Partnership Project (3GPP) is a worldwide consortium to create a specification for a globally applicable third generation (3G) mobile phone system. 3GPP's plans are currently in development under the title Long Term Evolution (LTE). The 3GPP LTE project is to improve the Universal Mobile Telecommunications System (UMTS) terrestrial radio access (UTRA) mobile phone standard to cope with future requirements. Goals of 3GPP LTE include improving efficiency, lowering costs, improving services, making use of new spectrum opportunities, and better integration with other open standards. The evolved UTRA (E-UTRA) system proposed by 3GPP LTE uses orthogonal frequency division multiple access (OFDMA) for the downlink (base station to mobile phone or terminal) and single carrier frequency division multiple access (SC-FDMA) for the uplink (mobile terminal to base station). In 3GPP LTE terminology, a base station is called a "Node-B" and a mobile terminal is called "user equipment" (UE). The 3GPP LTE technical specification is described in the reference document titled 3*rd Generation Partnership Project; Technical Specification Group Radio Access Network; Physical Channels and Modulation* (*Release* 8), 3GPP TS 36.211 V0.4.0 (2007-02).

The 3GPP LTE proposes a multiple-input multiple-output (MIMO) system with up to four antennas per base station. This requires that at least some of the terminals in the network be capable of receiving not only base station transmissions from two antennas (2-TX) but also base station transmissions from four antennas (4-TX). The base stations transmit a downlink reference signal (DLRS) that is modulated into reference symbols that are used by the terminals for channel estimation and measurements. There are two reference symbol structures of interest to 3GPP LTE: one for a 2-TX base station and one for a 4-TX base station. Thus each base station may be transmitting both reference symbol structures in each downlink radio frame and at the same location in each radio frame.

It is desirable to minimize the overhead occupied by the DLRS in the downlink. Also, the transmission by adjacent Node-Bs of the DLRS may cause multiple access interference (MAI) which will degrade performance. Thus what is needed is a 3GPP LTE wireless communication system that optimizes transmission of the DLRS from an individual Node-B as well as from adjacent Node-Bs.

SUMMARY OF THE INVENTION

The invention relates to a method and system for optimizing transmission of the downlink reference signal (DLRS) in a wireless communication system, like the $3^{rd}$ Generation Partnership Project Long Term Evolution (3GPP LTE) proposed cellular network. Each four-antenna (4-TX) Node-B (base station) in the network is capable of transmitting the reference symbols in different subframes of the OFDM radio frame and changing both the number and location of the subframes in response to changing network conditions. The network conditions include the number of 4-TX terminals being served by the Node-B and multiple access interference (MAI) from adjacent Node-Bs.

In one implementation, the reference symbols can be transmitted by each Node-B in a predefined pattern of subframe locations, with the pattern being selected from a set of unique patterns. Each pattern has a different number of subframes containing the reference symbols. In response to a change in the number of 4-TX capable terminals in the Node-B's cell, the Node-B increases or decreases the number of subframes in which the reference symbols are transmitted by selecting the appropriate one of the unique patterns in the set. The Node-Bs may use the same set of patterns. Alternatively, each Node-B may use a set different from the sets of other Node-Bs, particularly adjacent Node-Bs whose cells may overlap, to reduce MAI.

The method and system also allows a Node-B to change the location of the subframes in which the reference symbols are transmitted if an adjacent Node-B is causing MAI in the selected subframes. The terminals use the downlink reference symbols to measure interference, in the form of a signal-to-interference (SIR) value, and transmit the SIR value in the uplink to the Node-B. In response to the SIR values, the Node-B may select a different subframe or subframes in which to transmit the reference symbols to thereby reduce MAI.

For a fuller understanding of the nature and advantages of the present invention, reference should be made to the following detailed description taken together with the accompanying figures.

DETAILED DESCRIPTION OF THE INVENTION

Figure 1:
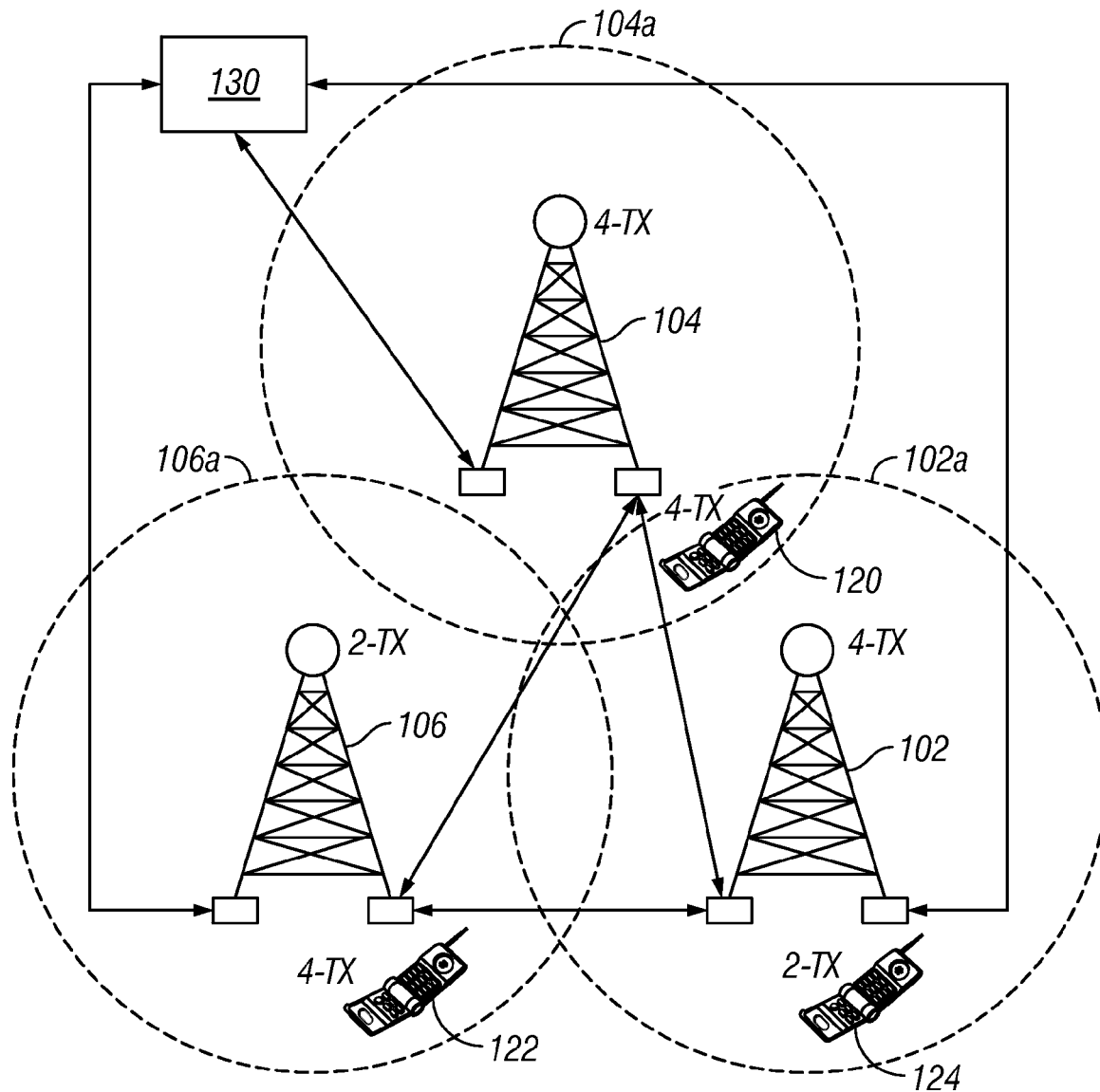
FIG. 1 is a diagram of a wireless communication system like that proposed by 3GPP LTE and shows multiple Node-Bs with overlapping cells and multiple terminals.

FIG. 1 is a diagram of a wireless communication system like that proposed by 3GPP LTE. The system includes a plurality of Node-Bs (base stations) 102, 104, 106; a plurality of UEs (mobile phones or terminals), such as mobile phones or terminals 120, 122, 124; and a central gateway 130 that provides connection of the system to the public telephone network. The Node-Bs 102, 104, 106 are connected to the gateway 130 and may be connected to each other.

Each Node-B may serve one or more cells. In the example of FIG. 1, Node-B 102 serves cells 102*a*; Node-B 104 serves cells 104*a*; and Node-B 106 serves cells 106*a*. 3GPP LTE proposes a multiple-input multiple-output (MIMO) system, so some of the Node-Bs may have multiple receive antennas and some may have multiple transmit antennas. There are no restrictions on the combinations of Node-B transmit and receive antennas. In a typical 3GPP LTE proposed network, a Node-B may have either two physical transmit antennas (2-TX) or four physical transmit antennas (4-TX). In FIG. 1, Node-B 102 and Node-B 104 are shown as being 4-TX Node-Bs and Node-B 106 is shown as being a 2-TX Node-B. The downlink refers to transmission from a Node-B to a terminal, and the uplink refers to transmission from a terminal to a Node-B. Some of the terminals may have multiple receive antennas and others may have only one receive antenna. In FIG. 1, terminals 120, 122 are depicted as having four receive antennas (4-TX) and terminal 124 is depicted as having two receive antennas (2-TX). Thus, at any time within any particular cell there will typically be some 4-TX terminals capable of receiving the downlink from a 4-TX Node-B.

Figure 2:
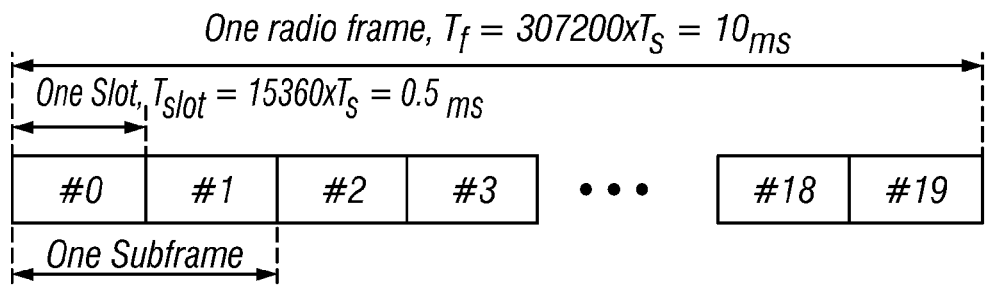
FIG. 2 is an illustration of the generic radio frame structure in the time domain for the orthogonal frequency division multiplexing (OFDM) downlink.

3GPP LTE uses orthogonal frequency division multiple access (OFDMA) for the downlink. The basic idea underlying orthogonal frequency division multiplexing (OFDM) is the division of the available frequency spectrum into several subcarriers. To obtain a high spectral efficiency, the frequency responses of the subcarriers are overlapping and orthogonal, hence the name OFDM. In the system of 3GPP LTE, the OFDMA downlink transmissions and the uplink transmissions are organized into radio frames with $T_f=307200 \times T_s=10$ ms duration. The generic frame structure is applicable to both frequency division duplex (FDD) (the application of frequency-division multiplexing to separate outward and return signals) and time division duplex (TDD) (the application of time-division multiplexing to separate outward and return signals). As shown in FIG. 2, each radio frame is $T_f=307200 \times T_s=10$ ms long and consists of 20 slots of length $T_{slot}=15360 \times T_s=0.5$ ms, numbered from 0 to 19. A subframe is defined as two consecutive slots where subframe i consists of slots $2i$ and $2i+1$. For FDD, 10 subframes are available for downlink transmission and 10 subframes are available for uplink transmissions in each 10 ms interval. Uplink and downlink transmissions are separated in the frequency domain. For TDD, a subframe is either allocated to downlink or uplink transmission. Subframe 0 and subframe 5 are always allocated for downlink transmission.

Figure 3:
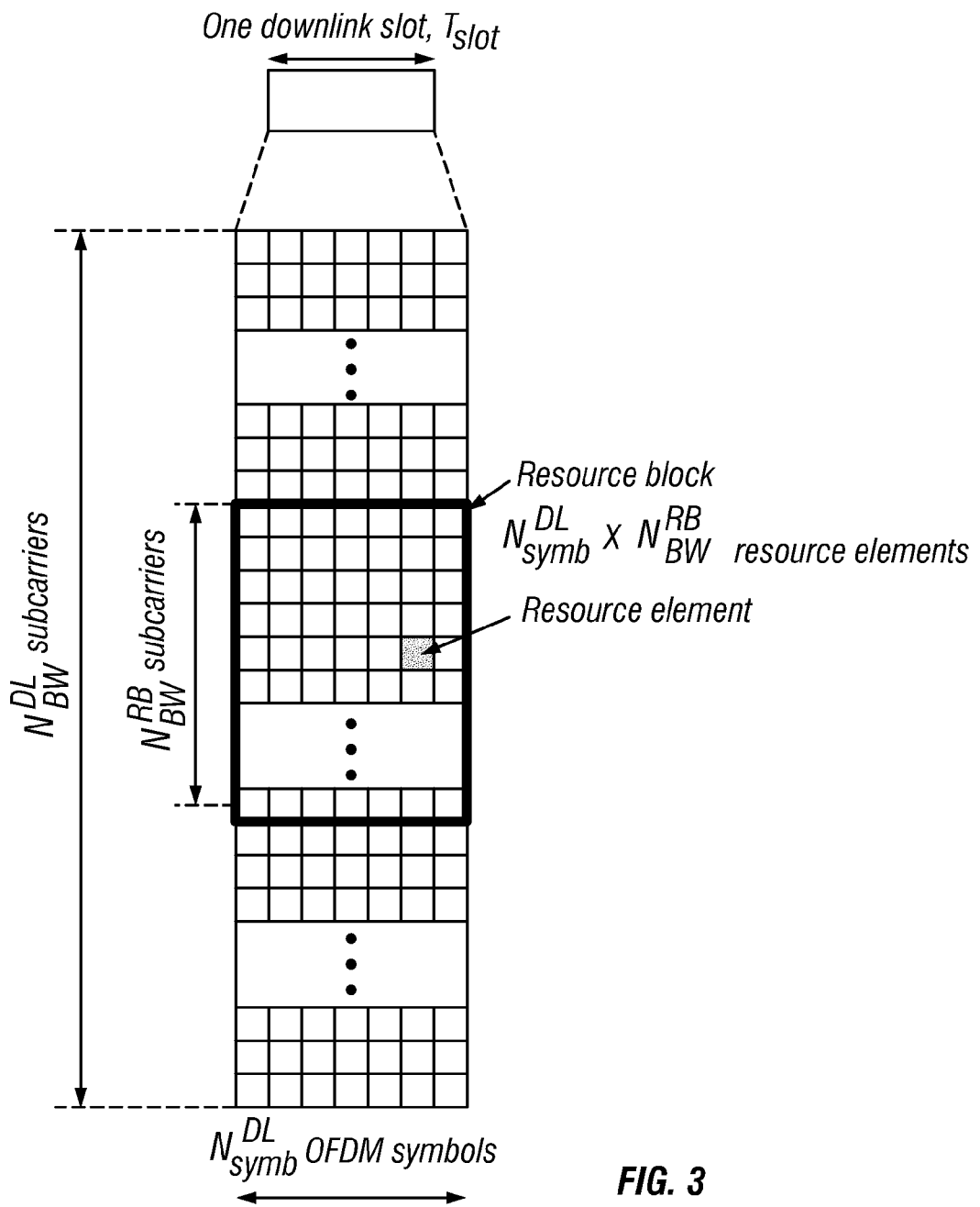
FIG. 3 is an illustration of the OFDM downlink resource grid and structure showing a resource block and resource elements within a resource block.

The downlink signal in each slot is described by a resource grid of $N_{BW}^{DL}$ subcarriers and $N_{symb}^{DL}$ OFDM symbols. The resource grid and structure is illustrated in FIG. 3. In case of multi-antenna transmission, there is one resource grid defined per antenna port. An antenna port is defined by a reference signal, unique within the cell. Each element in the resource grid for an antenna port p is called a resource element and is uniquely identified by the index pair (k, l) where k and l are the indices in the frequency and time domains, respectively. One, two, or four antenna ports are supported. A resource block is defined as $N_{symb}^{DL}$ consecutive OFDM symbols in the time domain and $N_{BW}^{RB}=12$ consecutive subcarriers in the frequency domain. A resource block thus consists of $N_{symb}^{DL} \times N_{BW}^{RB}$ resource elements.

Each Node-B transmits a downlink reference signal (DLRS) that is modulated into reference symbols in resource blocks. The reference signal is sometimes called the "pilot" and the reference symbols "pilot information." Since four antenna ports are supported there are four possible reference symbols (R1, R2, R3 and R4), with each of the four reference symbols being associated with an antenna port. The reference symbols are used by the terminals for channel estimation and physical measurements. Typical measurements that take place within the terminals include signal strength or signal-to-noise ratio (SNR), average pathloss, and signal-to-interference ratio (SIR) which may be represented by a channel quality indicator (CQI). These measurements are transmitted via the uplink back to the Node-Bs. In above, antenna port means physical or virtual antenna port.

It may be desirable to use the full Node-B power for 4-TX antennas for coverage enhancing even when the transmissions are performed using 2-TX antennas. One possibility to achieve this goal is to use precoding to create a set of virtual antennas from a set of physical antennas. Thus an antenna may be physical or virtual. The reference signals can also be precoded using a fixed precoding. The reference signals are then transmitted over the virtual antennas. It is also possible to create a smaller set of virtual antennas from a larger set of physical antennas. The concept of virtual antennas is described in detail in 3GPP LTE reference document *R1-063254, Reference signal structure for 4-TX antenna MIMO*, 3GPP TSG RAN WG1 Meeting #47, Riga, Latvia, 6-10 Nov., 2006.

Figure 4:
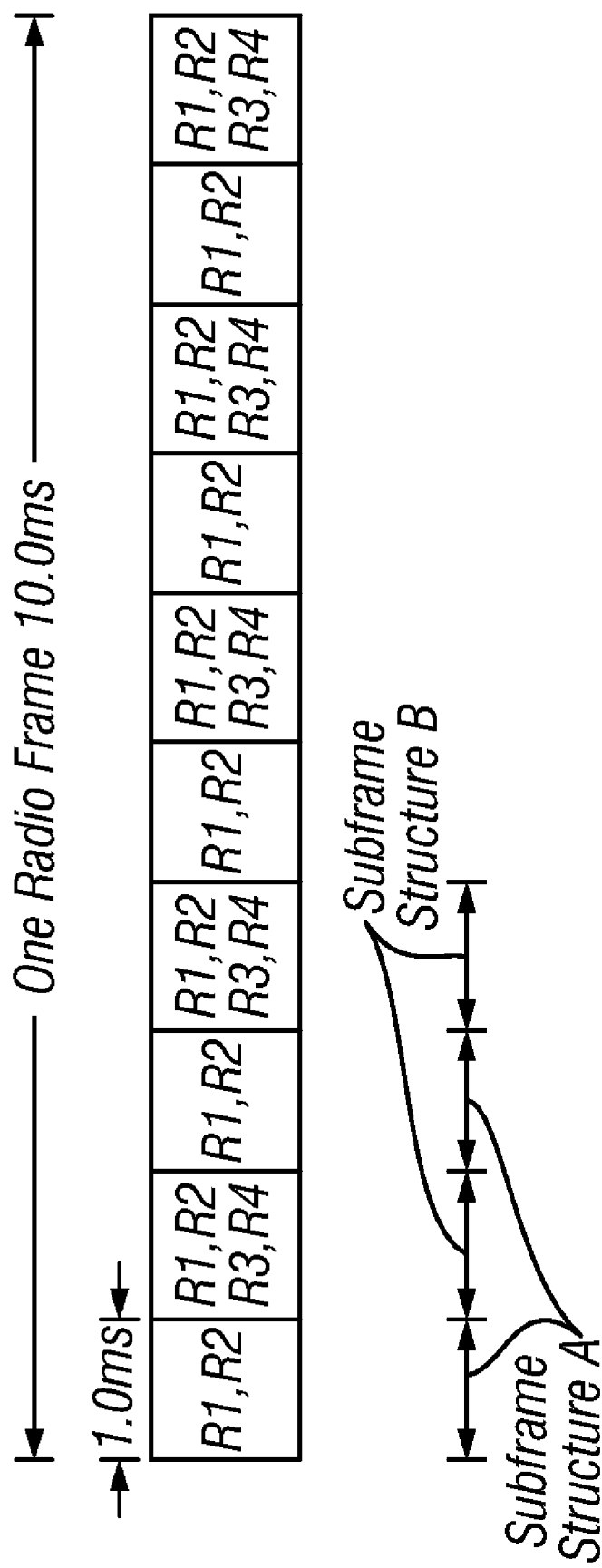
FIG. 4 is an illustration of a radio frame wherein reference symbols R1 and R2 are transmitted in each subframe of the radio frame and reference symbols R3 and R4 are transmitted in alternate subframes of each radio frame.
Figure 5A:
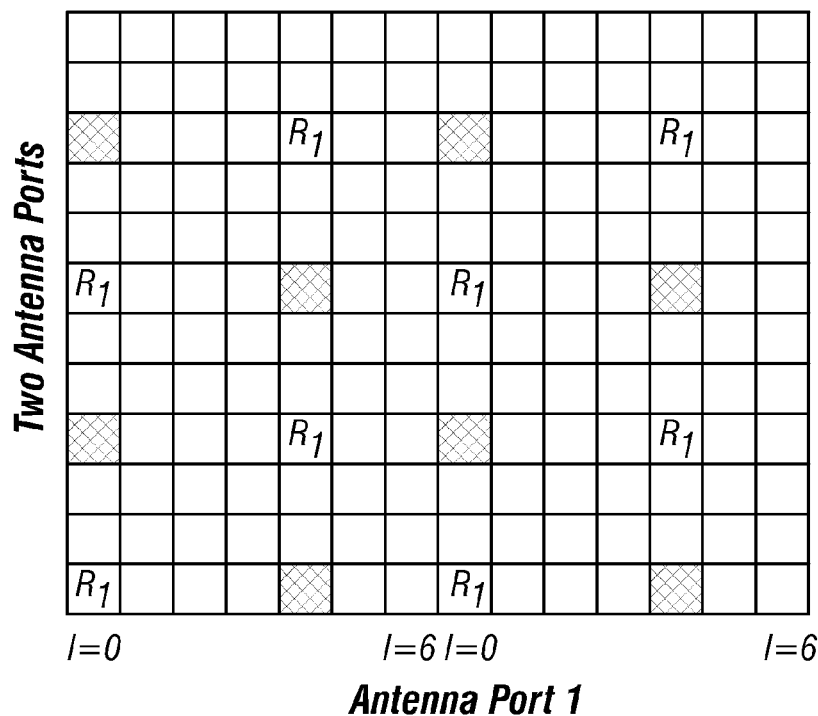
FIG. 5A is an illustration of a subframe reference symbol (RS) structure A showing the location of reference symbols R1 and R2 in the resource block.
Figure 5A:
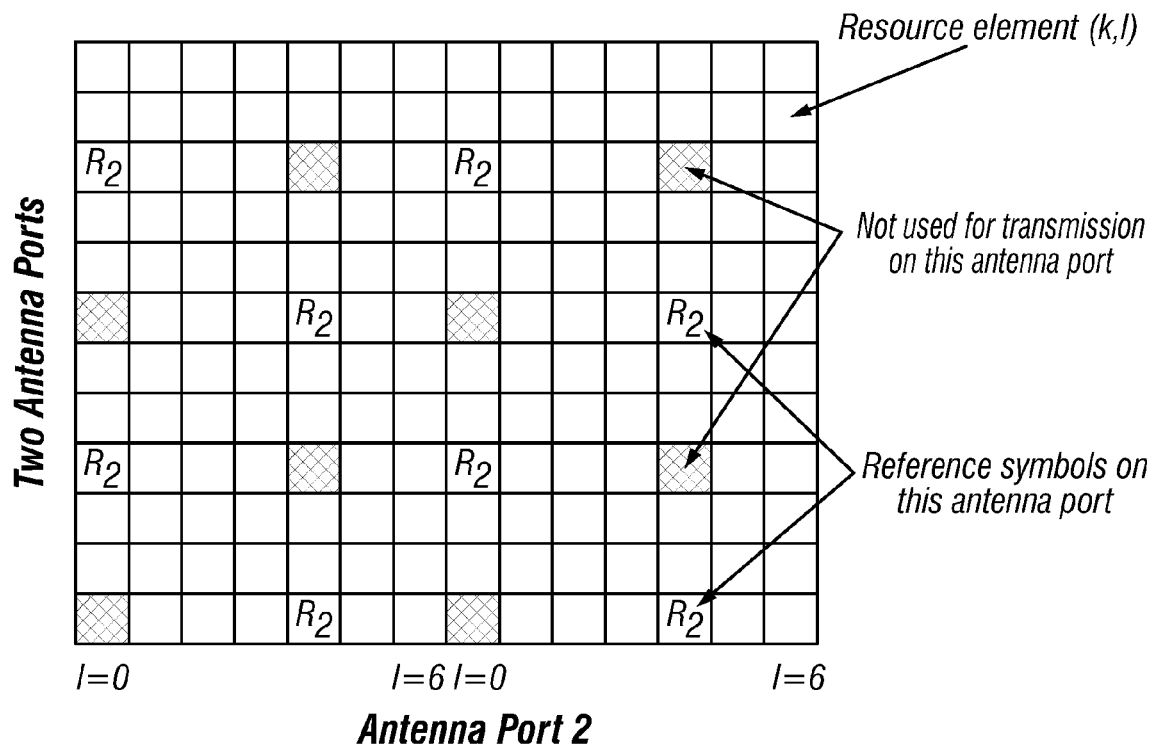
Figure 5B:
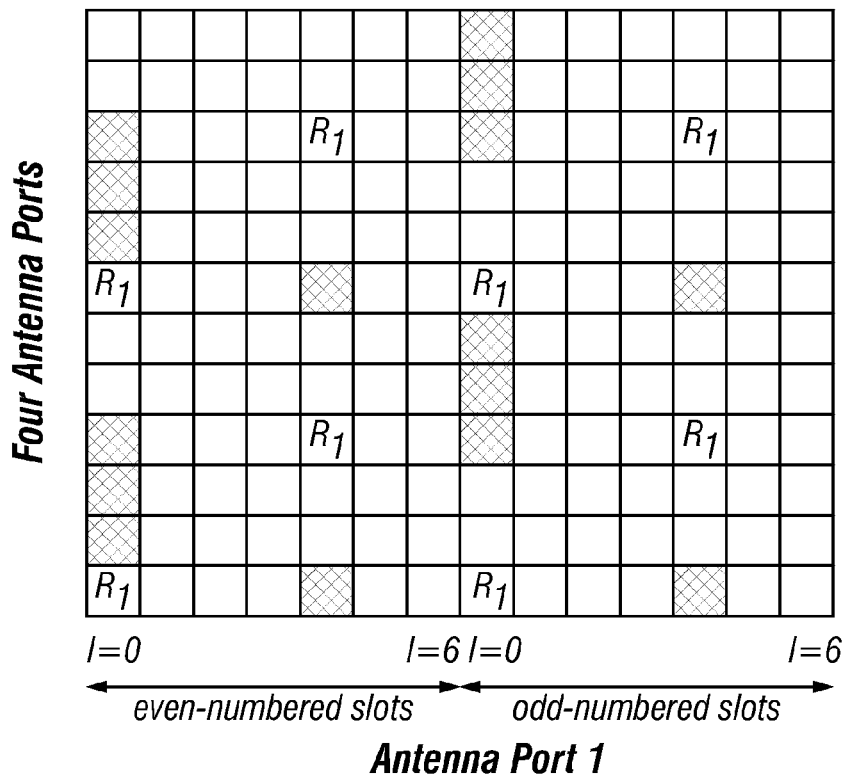
FIG. 5B is an illustration of a subframe RS structure B showing the location of reference symbols R1, R2, R3 and R4 in the resource block.
Figure 5B:
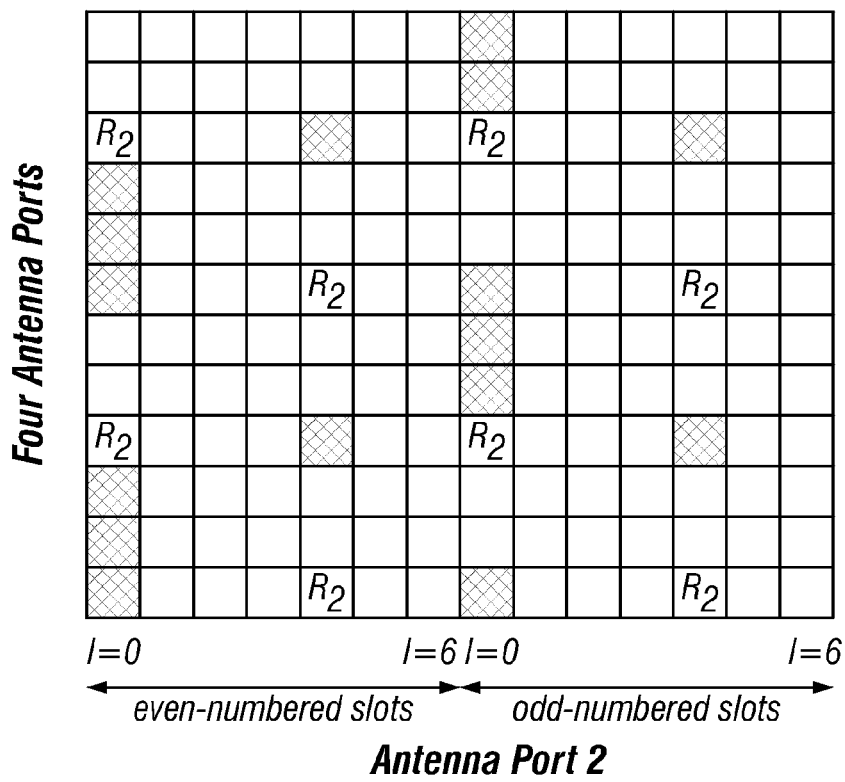
Figure 5B:
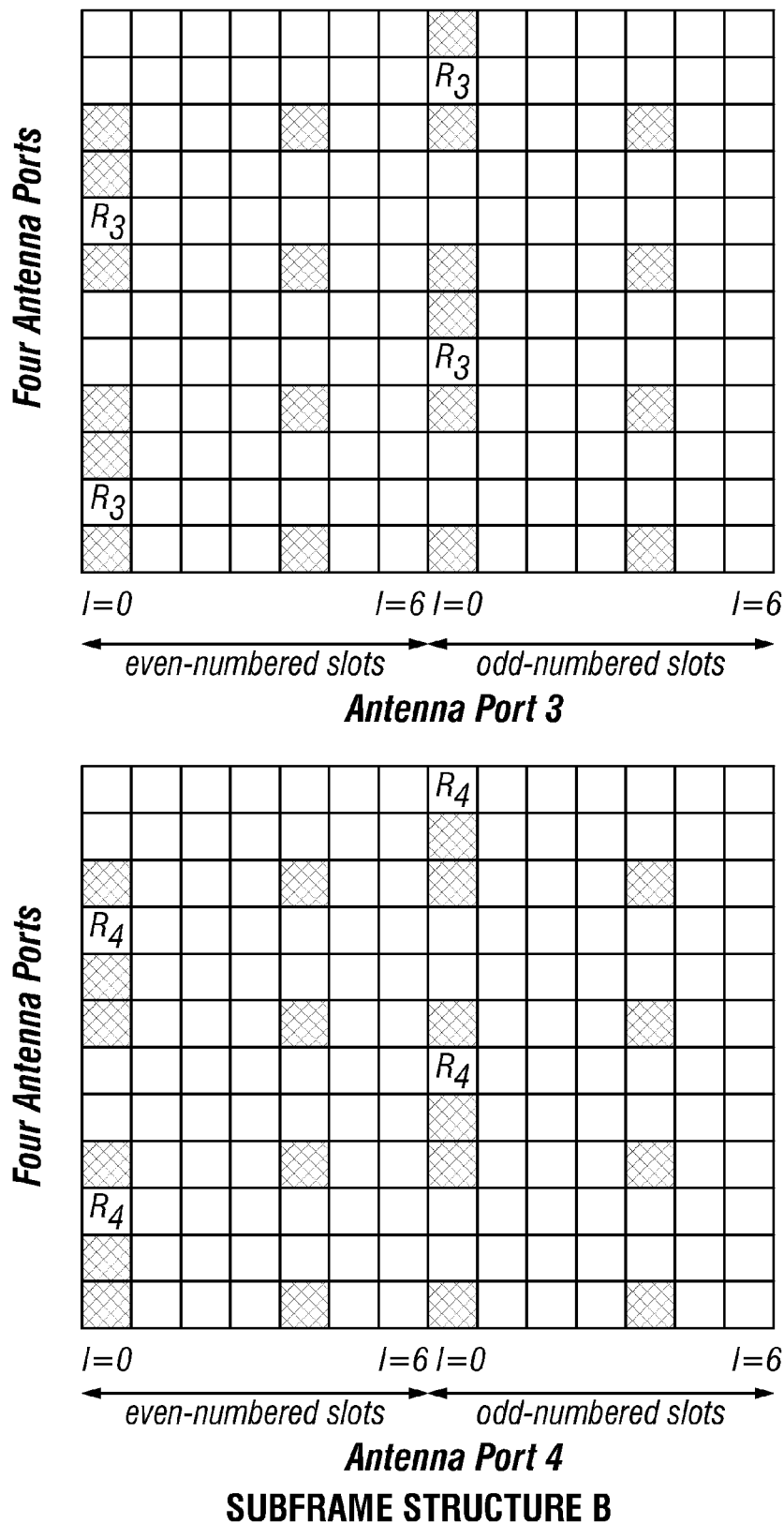

One proposed method of reference signal transmission is as shown in FIG. 4, wherein R1 and R2 are transmitted in each subframe of the radio frame and R3 and R4 are transmitted in alternate subframes of each radio frame. Thus two subframe reference symbol (RS) structures are represented: subframe RS structure A wherein R1 and R2 are transmitted, and subframe RS structure B wherein R1, R2, R3 and R4 are transmitted. FIG. 5A shows the resource block for subframe structure A, and FIG. 5B shows the resource block for subframe structure B.

Figure 5C:
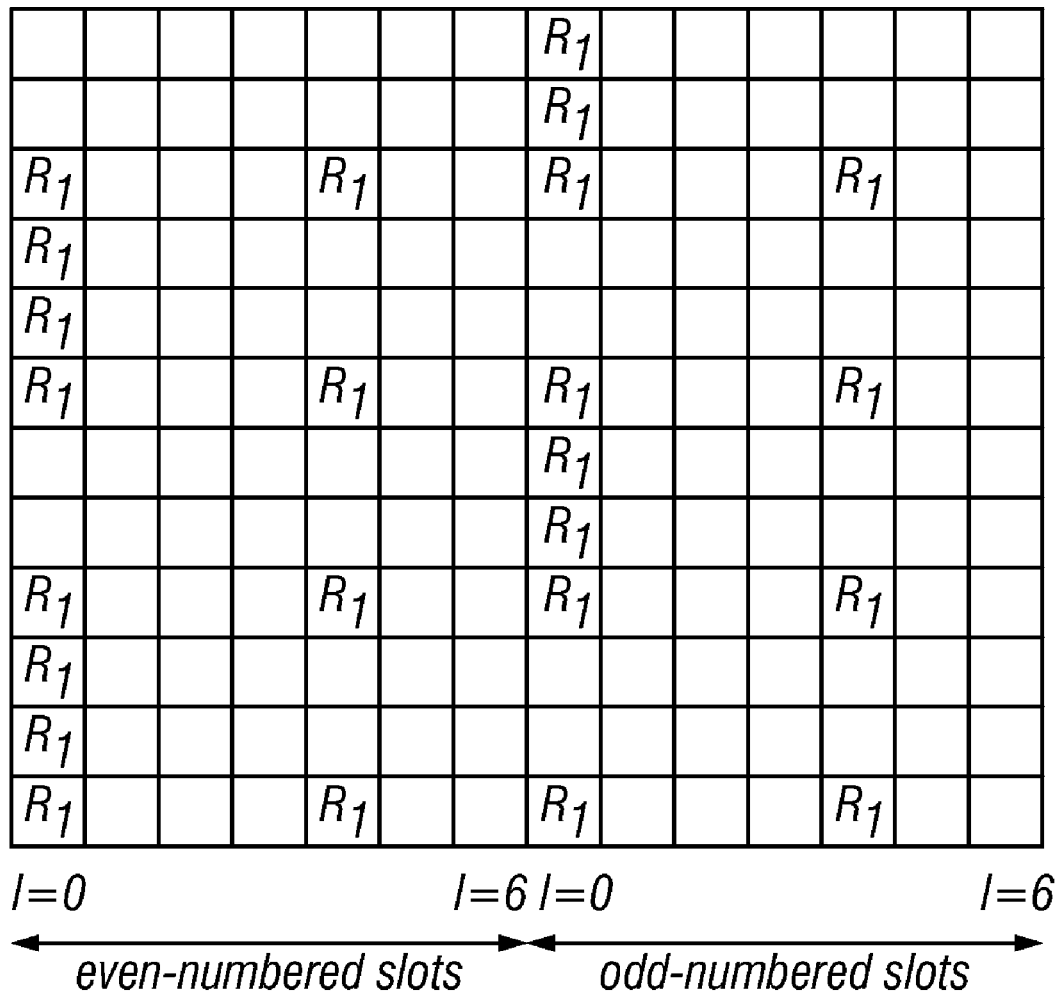
FIG. 5C is an illustration of a subframe RS structure C showing the location of reference symbol R1 in the resource block.
Figure 5D:
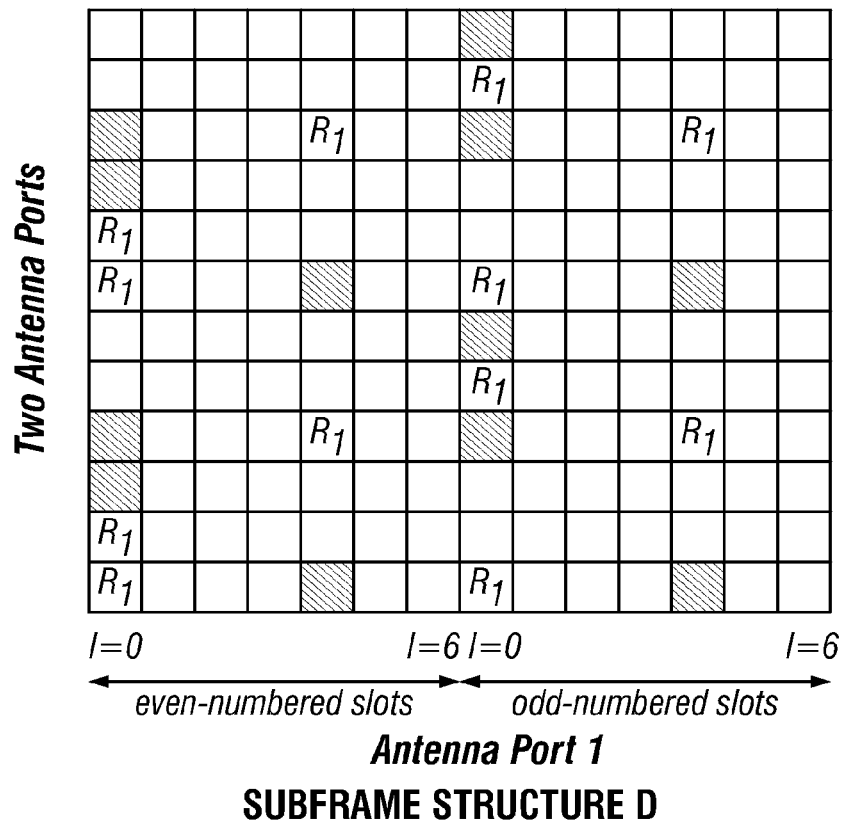
FIG. 5D is an illustration of a subframe RS structure D showing the location of reference symbols R1 and R2 in the resource block.
Figure 5D:
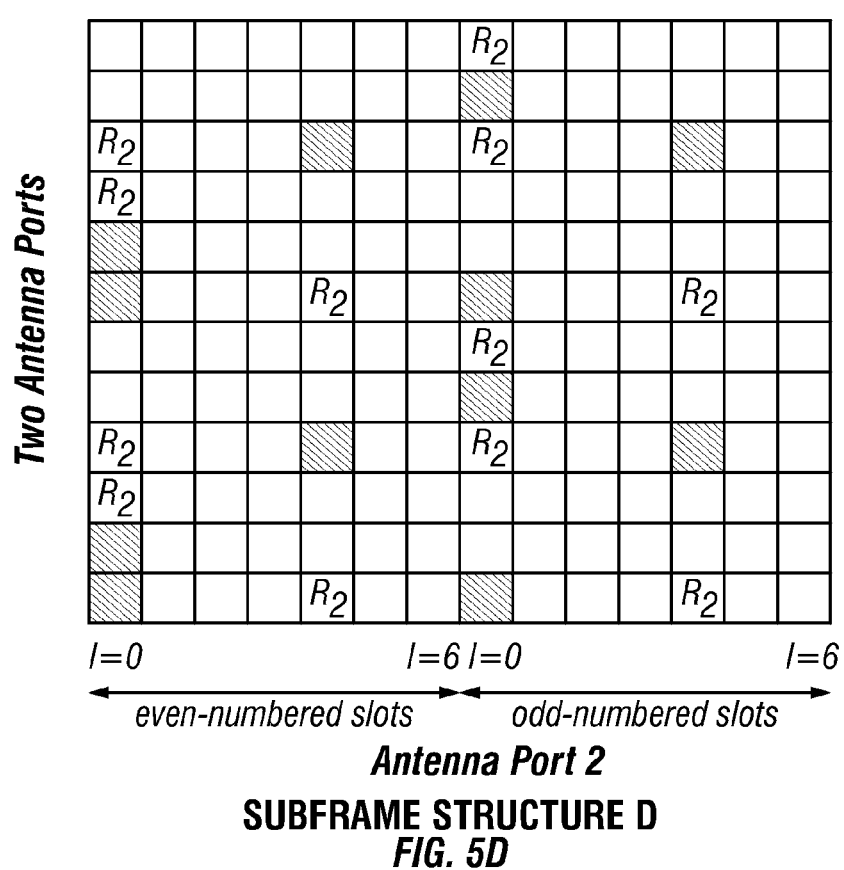

Of course, it is possible to use three or more different subframe structures, for example a subframe structure C wherein only R1 is transmitted, a subframe structure D wherein R1 and R2 are transmitted, and a subframe structure E wherein R1, R2, R3 and R4 are transmitted. FIG. 5C shows the resource block for subframe structure C and FIG. 5D shows the resource block for subframe structure D. The resource block for subframe structure E is identical to the resource block for subframe structure B shown in FIG. 5B. Depending on the subframe structure C, D or E, the density of reference symbols within the subframe is different, which means that the channel estimation accuracy is different depending on the subframe structure C, D or E.

It is desirable to minimize the overhead occupied by the DLRS in the downlink. This invention recognizes that reference symbols R3 and R4, associated with antenna ports 3 and 4, respectively, may not need to be transmitted as frequently as proposed (see FIG. 4), and thus provides a method to optimize the frequency of transmission of subframe structure B by increasing or decreasing the number of subframes in which subframe structure B is transmitted.

Figure 6:
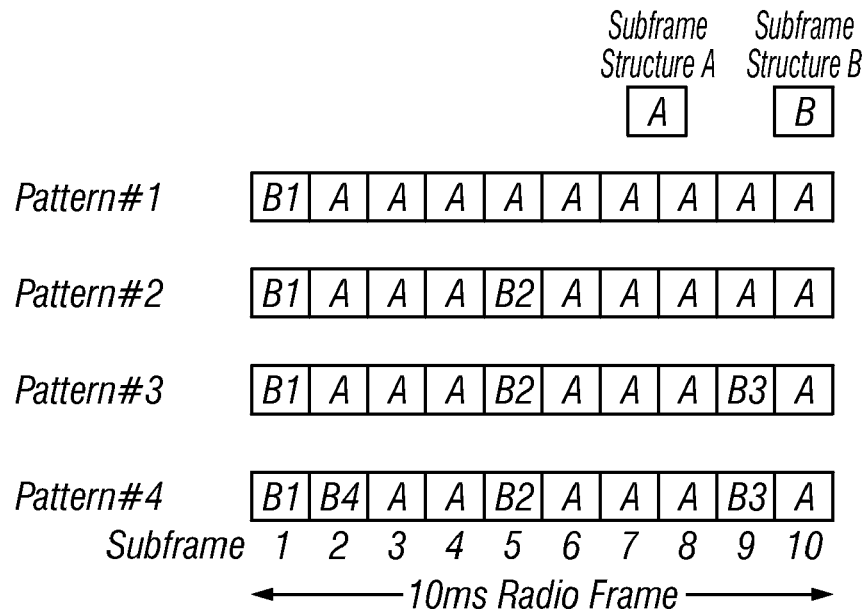
FIG. 6 is an illustration of a set of four predefined unique patterns for transmission of subframe RS structures A and B in a radio frame.
Figure 7:
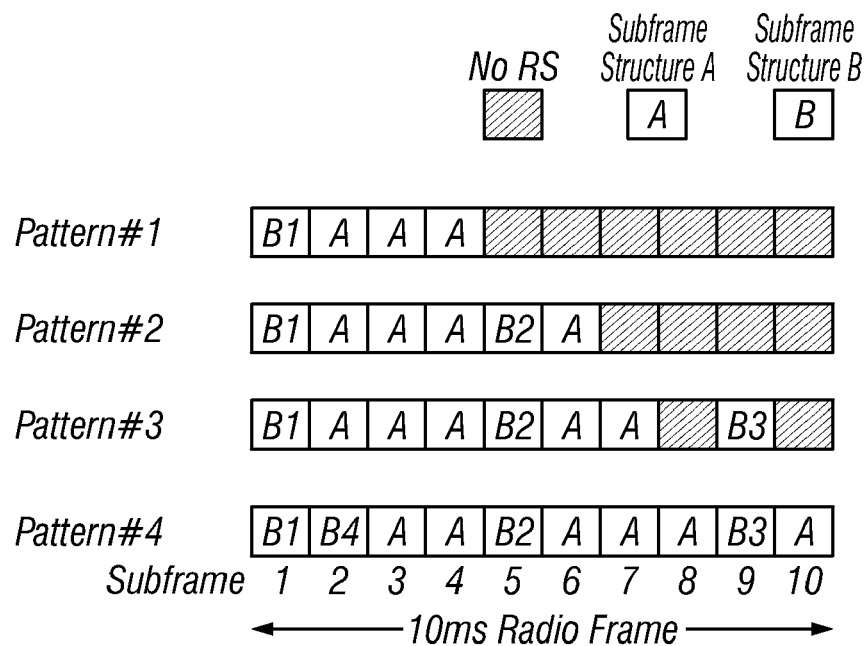
FIG. 7 is an illustration of the set of patterns of FIG. 6, but wherein no RS is transmitted in some of the subframes.

In one implementation of the invention a set of at least two predefined unique patterns is available for each Node-B. One set of four patterns is shown in FIG. 6. In pattern 1, subframe structure B occurs only once per radio frame (B1 at subframe 1). In pattern 2, subframe structure B occurs twice per radio frame (B1 at subframe 1 and B2 at subframe 5). In pattern 3, subframe structure B occurs three times per radio frame (B1 at subframe 1, B2 at subframe 5, and B3 at subframe 9). In pattern 4, subframe structure B occurs four times per radio frame (B1 at subframe 1, B2 at subframe 5, B3 at subframe 9, and B4 at subframe 2). It is understood that FIG. 6 is just one example, and thus the number of patterns may be more or less than four, and the locations of the subframe structure Bs within each pattern may be different than in the example of FIG. 6. It is also within the scope of the invention that some of the patterns may have subframes that contain no RS, as depicted in FIG. 7.

In addition to measurement information in the uplink, each terminal also transmits capability information to the Node-Bs, which includes identification of the terminal as a 4-TX MIMO terminal. Thus each Node-B has information on the number of 4-TX terminals within its cell at any one time.

In this invention the number of subframes in which subframe structure B is transmitted can be varied. For example, the operator of a Node-B may select pattern 1 in FIG. 6 when the Node-B first becomes operational, and then if the number of 4-TX terminals increases select pattern 2. Also, the operator may select the appropriate pattern on a regular basis, for example each day of the week, based on the daily history of the number of 4-TX terminals within the Node-B's cell.

In another example, the Node-B may dynamically select the appropriate pattern as the number of 4-TX terminals in the cell changes. The decision to switch from one pattern to the next, for example to double the frequency of subframe structure B transmission by switching from pattern 1 to pattern 2, would be based on the number of 4-TX terminals in the cell increasing above a predetermined threshold and remaining above that threshold for a predetermined period of time.

Figure 8:
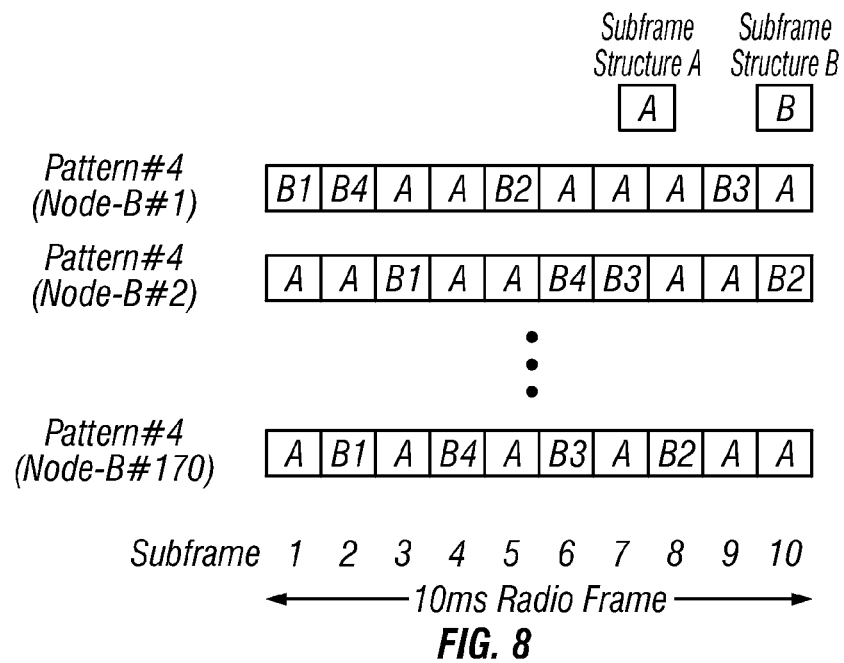
FIG. 8 is an illustration of radio frames for three different Node-Bs and shows three unique types of a pattern with four subframe structure Bs per radio frame, with each pattern being associated with a Node-B.

The set of predefined patterns, like in the examples of FIG. 6 or 7, may be identical for each Node-B. However, there may be a plurality of pattern sets, so that most if not all Node-Bs would have a unique set of patterns different from the set of other Node-Bs. In particular, physically adjacent Node-Bs which may have overlapping cells, as depicted in FIG. 1, may have different sets of patterns. In this implementation multiple access interference (MAI) from overlapping cells may be minimized. FIG. 8 shows an example of three unique types of pattern 4 (four subframe structure Bs per radio frame) wherein the subframe locations for the subframe structure Bs are different for each Node-B. While not shown in FIG. 8, patterns 1, 2 and 3 would also be different for each of the Node-Bs. In 3GPP LTE, each Node-B may have a unique identification, called a "Cell Group ID". The terminals are capable of identifying a Node-B by detecting its Cell Group ID. Subframe locations for the subframe structure Bs may be associated with Cell Group IDs. Thus by associating subframe locations for the subframe structure Bs with Cell Group IDs, the terminals can easily find the locations of subframe structure Bs.

Figure 9A:
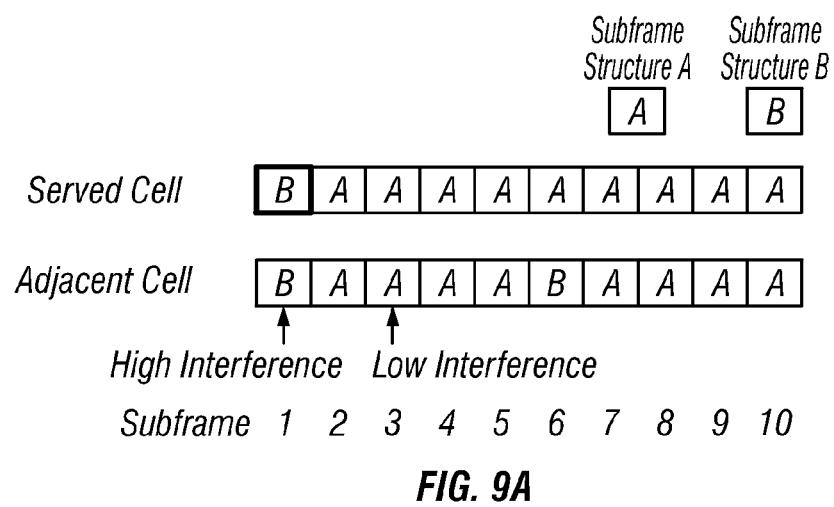
FIG. 9A illustrates the location of a subframe RS structure B in a radio frame with intercell interference from an adjacent cell.
Figure 9B:
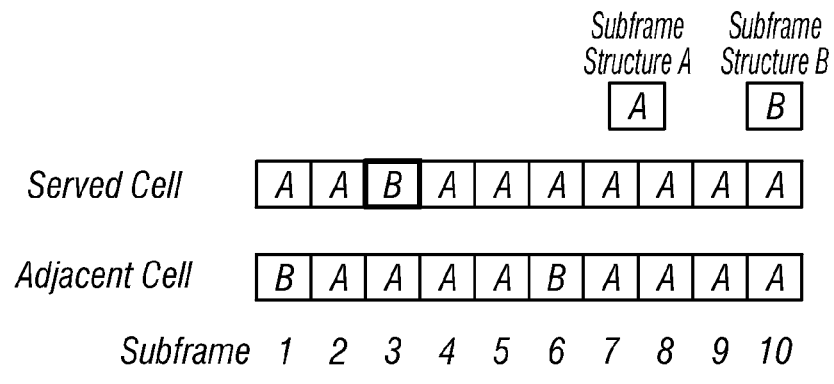
FIG. 9B illustrates the location of the subframe RS structure B in the radio frame after repositioning to a subframe with low intercell interference.

This invention also allows the location of the subframe for subframe RS structure B to be changed if there is intercell interference, i.e., signal interference from adjacent Node-Bs. For example, in FIG. 1 the 4-TX terminal 120 is located in both cells 102a and 104a, but may presently be served by Node-B 102 and may be subject to signal interference from Node-B 104 that serves adjacent cell 104a. This aspect of the invention is shown in FIGS. 9A-9B. In FIG. 9A, the 4-TX terminal is in the served cell and the Node-B in that served cell is transmitting one subframe structure B per radio frame at subframe 1. A Node-B in an adjacent cell is transmitting two subframe structure Bs per radio frame at subframes 1 and 6. The terminal measures signal interference from the adjacent cell for each subframe, in the form of signal-to-interference ratio (SIR), and reports that information to the Node-B for the served cell. In the example of FIG. 9A, the terminal has measured high interference in subframe 1 and low interference in subframe 3. In response to the SIR information received in the uplink, the Node-B of the served cell then selects a new subframe in which to transmit subframe structure B. The selection of the new subframe may be made using a particular algorithm, or simply by selecting the subframe with the lowest interference (highest SIR value). This is shown in FIG. 9B where subframe structure B has been repositioned and is now transmitted in subframe 3. In this manner MAI is minimized. The SIR information transmitted by the terminal may be represented by the CQI, which is measured in the terminal and derived from the reference symbols as part of the channel estimation process. Other techniques are known to measure the SIR in the terminal, for example as described in the 3GPP LTE reference document $R1$-06-3392, *SINR measurements for Scheduling with Interference Coordination,* 3GPP TSG RAN WG1 #47 Meeting, Riga, Latvia, Nov. 6-10, 2006.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for transmitting a reference signal in a wireless communications network that uses orthogonal frequency division multiplexing (OFDM) and includes a plurality of base stations and a plurality of transmit/receive terminals, a base station having multiple antennas and transmitting to a terminal a downlink reference signal comprising a plurality of reference symbols in resource blocks, a resource block comprising a plurality of OFDM subcarriers and a plurality of OFDM symbols in time slots of a radio frame, a radio frame comprising a plurality of subframes, the method comprising:
    transmitting at least two subframe reference symbol (RS) structures within a radio frame, a first subframe RS structure representing a first set of antennas and transmitted in a plurality of radio subframes and a second subframe RS structure representing a second set of four antennas (4-TX) in a multiple-input multiple-output (MIMO) system and transmitted in at least one radio subframe;

prior to transmitting, determining the radio subframe in which to transmit said second subframe RS structure; and in response to an increase in the number of 4-TX capable terminals transmitting to the base station, increasing the number of radio subframes in which to transmit said second subframe RS structure.

2. The method of claim 1 wherein determining the radio subframe in which to transmit said second subframe RS structure comprises selecting one pattern from a set of predefined unique patterns, each pattern being predefined locations of radio subframes for said second subframe RS structure.

3. The method of claim 2 wherein the set of predefined unique patterns comprises a first pattern with a first subframe location and a second pattern with said first subframe location and a second subframe location, wherein determining the radio subframe in which to transmit said second subframe RS structure comprises selecting said first pattern, and wherein increasing the number of radio subframes in which to transmit said second subframe RS structure comprises selecting said second pattern.

4. The method of claim 3 wherein the set of predefined unique patterns further comprises a third pattern with said first and second subframe locations and a third subframe location, and wherein increasing the number of radio subframes in which to transmit said second subframe RS structure comprises selecting said third pattern.

5. The method of claim 2 wherein a first base station is associated with a first set of predefined patterns and a second base station is associated with a second set of predefined patterns different from said first set.

6. The method of claim 5 wherein each base station has a unique cell group identification (ID) and further comprising each base station transmitting its cell group ID to a terminal, whereby a terminal may detect the set of predefined patterns associated with a base station.

7. The method of claim 1 wherein increasing the number of radio subframes in which to transmit said second subframe RS structure comprises increasing the number of radio subframes in which to transmit said second subframe RS structure when the number of 4-TX capable terminals transmitting to the base station exceeds a predetermined threshold and remains above said threshold for a predetermined time period.

8. The method of claim 1 wherein determining the radio subframe in which to transmit said second subframe RS structure comprises gathering interference measurement information from terminals transmitting to the base station, and selecting said radio subframe in response to the gathered interference measurement information.

9. The method of claim 1 further comprising not transmitting either a first or a second subframe RS structure in at least one of the radio subframes within the same radio frame as said first and second subframe RS structures.

10. The method of claim 1 wherein said antennas may be physical antennas or virtual antennas.

11. A cellular network comprising:

at least two base stations, each having four antennas (4-TX) in a multiple-input multiple-output (MIMO) system and capable of orthogonal frequency division multiplexing (OFDM) downlink transmission of reference symbols representing said four antennas, the reference symbols being transmitted in time slots of a radio frame, a radio frame comprising a plurality of subframes; and a plurality of mobile transmit/receive terminals, each terminal capable of uplink transmission identifying itself as a 4-TX MIMO capable terminal;

wherein a first base station is capable of transmitting the reference symbols in predefined subframes of a radio frame, the predefined subframes comprising first and second predefined unique patterns, the second pattern having more subframe locations for the reference symbols than the first pattern;

wherein a second base station is capable of transmitting the reference symbols in predefined subframes of a radio frame different from the subframes in which the first base station is transmitting; and wherein said first base station is capable of selecting said second pattern in response to an increase in the number of terminals transmitting an uplink to said first base station and selecting said first pattern in response to a decrease in the number of terminals transmitting an uplink to said first base station.

12. The network of claim 11 wherein each base station is capable of transmitting a unique cell group identification (ID) and each terminal is capable of receiving said cell group ID and identifying the set of predefined unique patterns from said cell group ID.

* * * * *